US005802605A

United States Patent [19]
Alpert et al.

[11] Patent Number: 5,802,605
[45] Date of Patent: *Sep. 1, 1998

[54] PHYSICAL ADDRESS SIZE SELECTION AND PAGE SIZE SELECTION IN AN ADDRESS TRANSLATOR

[75] Inventors: Donald B. Alpert, Santa Clara; Kenneth D. Shoemaker, Saratoga, both of Calif.; Kevin C. Kahn, Portland; Konrad K. Lai, Aloha, both of Oreg.

[73] Assignee: Intel Corporation, Santa Clara, Calif.

[ * ] Notice: The term of this patent shall not extend beyond the expiration date of Pat. No. 5,617,554.

[21] Appl. No.: 756,184

[22] Filed: Nov. 25, 1996

Related U.S. Application Data

[63] Continuation of Ser. No. 372,805, Dec. 23, 1994, Pat. No. 5,617,554, which is a continuation of Ser. No. 832,944, Feb. 10, 1992, abandoned.

[51] Int. Cl.$^6$ ................................................. G06F 12/10
[52] U.S. Cl. ................................................. 711/208; 711/212
[58] Field of Search ...................... 395/421.02, 416, 395/418

[56] References Cited

U.S. PATENT DOCUMENTS

| | | | |
|---|---|---|---|
| 4,340,932 | 7/1982 | Bakula et al. | 395/402 |
| 4,432,053 | 2/1984 | Gaither et al. | 395/416 |
| 4,591,972 | 5/1986 | Guyer et al. | 395/569 |
| 4,654,777 | 3/1987 | Nakamura | 395/416 |
| 4,669,043 | 5/1987 | Kaplinsky | 395/403 |
| 4,679,140 | 7/1987 | Gotou et al. | 395/775 |
| 4,758,946 | 7/1988 | Shar et al. | 395/416 |
| 4,763,250 | 8/1988 | Keshlear et al. | 395/418 |
| 4,792,897 | 12/1988 | Gotou et al. | 395/417 |
| 4,835,734 | 5/1989 | Kodaira et al. | 395/419 |
| 4,972,338 | 11/1990 | Crawford et al. | 395/416 |
| 4,979,098 | 12/1990 | Baum et al. | 395/418 |
| 5,023,777 | 6/1991 | Sawamoto | 395/402 |
| 5,263,140 | 11/1993 | Riordan | 711/207 |
| 5,475,827 | 12/1995 | Lee et al. | 711/207 |

FOREIGN PATENT DOCUMENTS

| | | |
|---|---|---|
| 0113240 | 12/1983 | European Pat. Off. . |
| 1595740 | 5/1978 | United Kingdom . |
| 2127994 | 6/1983 | United Kingdom . |

OTHER PUBLICATIONS i860™ *Microprocessor Family Programmer's Reference Manual*, Intel Corporation Literature Sales, Chapter 4, pp. 1–13 (1991).

Patterson, David A. and Hennessey, John L. *Computer Architecture: A Quantative Approach*, Morgan Kaufman Publishers, Inc. pp. 432–485, (1990).

(List continued on next page.)

*Primary Examiner*—Eddie P. Chan
*Assistant Examiner*—Reginald G. Bragdon
*Attorney, Agent, or Firm*—Blakely, Sokoloff, Taylor & Zafman

[57] ABSTRACT

An address translator and a method for translating a linear address into a physical address for memory management in a computer is described herein. Different memory sizes, and different page sizes can be selected. The address translator can translate from a standard 32-bit linear address for compatibility with previous 32-bit architectures, and can also translate to a physical memory size with a larger physical address than linear address; i.e., greater than 32 bits (e.g. 36 bits and up), with no increase in access time. The address translator translates a linear address that includes an offset and a plurality of fields used to select entries in a plurality of tables. The format of the linear address into fields is dependent upon the selected memory size and the selected page size. For a large memory size, the tables include a directory pointer table that includes a group of directory pointers, a plurality of page table directories each of which includes a group of page directory entries, and a plurality of page tables each of which includes a group of page table entries. The size of the entries in the tables is dependent upon the selected memory size. The contents of the tables are stored in memory, and furthermore the pointer table is stored in both main memory and in dedicated pointer table registers.

18 Claims, 12 Drawing Sheets

OTHER PUBLICATIONS

Nelson, Ross P. *The* 80386 *Book*, Microsoft Press, Chapter 6, pp. 125–134, (1988).

*i*486™ *Processor Programmer's Reference Manual*, Intel Corporation Literature Sales, Chapter 5, pp. 1–25 (1990).

*i*860™ *XP Microprocessor Data Book*, Intel Corporation Literature Sales, Chapter 2, pp. 21–27, (May 1991).

SUN Microsystems, *The SPARC*™ *Architecture Manual Version* 8, Sun Microsystems, Inc., pp. 237–255, (Dec. 11, 1990).

| <20> | 0 | 0 | 0 | 0 | 0 | P C W D T | P W T | 0 | 0 |
|---|---|---|---|---|---|---|---|---|---|

PAGE DIRECTORY ADDRESS

CONTROL REGISTER 3 FORMAT

| <20> | OS RES. | 0 | 0 | 0 | A | P C D | P W T | U | W | P |
|---|---|---|---|---|---|---|---|---|---|---|

<3>

PAGE TABLE ADDRESS

PAGE DIRECTORY ENTRY FORMAT

| <20> | OS RES. | 0 | 0 | D | A | P C D | P W T | U | W | P |
|---|---|---|---|---|---|---|---|---|---|---|

<3>

PAGE FRAME ADDRESS

PAGE TABLE ENTRY FORMAT

FIG. 5

| PAGE DIRECTORY ADDRESS | 0 | 0 | 0 | 0 | 0 | 0 | PCD | PWT | 0 | 0 |
|---|---|---|---|---|---|---|---|---|---|---|
| <20> | | | | | | | | | | |

CONTROL REGISTER 3 FORMAT

| PAGE TABLE ADDRESS | OS RES. | RES | PS | 0 | A | PCD | PWT | U | W | P |
|---|---|---|---|---|---|---|---|---|---|---|
| <20> | | | | | | | | | | |

PAGE DIRECTORY ENTRY FORMAT (PDE.PS=0)

| PAGE FRAME ADDRESS | OS RES. | 2 RES. BITS | D | A | PCD | PWT | U | W | P |
|---|---|---|---|---|---|---|---|---|---|
| <20> | | | | | | | | | |

PAGE TABLE ENTRY FORMAT

FIG. 6

PHYSICAL ADDRESS SIZE SELECTION AND PAGE SIZE SELECTION IN AN ADDRESS TRANSLATOR

This is a continuation of application Ser. No. 08/372,805, filed on Dec. 23, 1994, now U.S. Pat. No. 5,617,554, which is a continuation of application Ser. No. 07/832,944, filed on Feb. 10, 1992, abandoned.

BACKGROUND OF THE INVENTION

1. Field of the Invention

The present invention relates to computer memory management methods and apparatus for translating between a virtual address and a physical address stored in a plurality of pages in main memory.

2. Description of Related Art

A computer typically includes main memory and secondary memory. A microprocessor may be included to control the writing and reading of these memory elements. Main memory, constructed of RAM (Random Access Memory) chips is much faster than secondary memory such as a hard disk drive, but main memory is typically much more expensive per memory element. Thus, computers are usually designed with a main memory limited in size and a much larger secondary memory. Microprocessors designed to use virtual memory effectively extend main memory space into secondary memory space. Typically, virtual memory microprocessors use techniques such as paging or segmentation, or both, to simulate a larger memory.

Virtual memory provides many advantages. It is possible to run applications that require more RAM (Random Access Memory) than is actually available. Furthermore, it is possible for more than one application to run at the same time. Virtual memory gives an applications programmer a view of more main memory than actually exists. To a programmer, virtual memory appears as one contiguous block of main memory. An applications programmer seeking storage space does not have to concern himself with the actual physical location of that data, whether the data it be in main memory, or on a hard disk.

In virtual memory systems, the term "physical memory" is used to define the physical address space seen by the operating system. Thus, the size of the physical address space will often be larger than the main memory available in the system. However, the data at any specific physical address must be accessed within the main memory. In operation of virtual memory systems, if requested data is not in main memory, then an operating system exception will be generated and the data will be transferred from secondary storage to main memory under the auspices of the operating system. If paging has been implemented, then a page validity bit may be associated with each page to indicate whether or not the page is in main memory. If the page validity bit indicates that a requested page is not in main memory, then the data is transferred to main memory and the page validity bit is set to indicate that the page is now in main memory.

Virtual memory systems can be categorized into two types: those with variable sized blocks, called "segments", and those with fixed size blocks, called "pages". One, or a combination of these two different methods are used to translate from a virtual address to a physical address. Using segmentation, a block of physical memory is allocated based on the amount of data to be stored. Thus, in a segmented memory structure, one segment may be large and the next may be very small. Segmentation uses memory efficiently, however there are disadvantages. Problems arise when a segmented data structure is modified to be larger. The smaller block must be replaced, and a new, larger block must be found. This problem is substantial, particularly when it is recognized that data structures are often modified.

Paging is the other method of translating a virtual address to a physical address. Pages are fixed size blocks of memory that are mapped in specific locations in physical memory. A "page" is what the programmer sees (part of the logical or linear address), and the "page frame" is the physical memory itself. One or more tables are provided, each of which has a number of page table entries. Each page table entry specifies a specific page frame. The virtual address includes information that is indicative of the table and the page frame.

The use of pages provides advantages. Paging is generally efficient; there are no unused blocks but internal fragmentation (i.e., an unused portion of a page) can be a problem. Replacing a block is trivial. If data is modified to include additional information, then additional pages can be employed. From a design point of view, paging is generally preferred for bigger systems because paging makes allocation of memory easier.

The page size is an important architectural parameter. Choosing a page size is a question of balancing forces that favor a larger page size versus those favoring a smaller size. Advantages of larger page size include memory resources that are saved by use of larger page size, and efficient transfer of larger pages to and from secondary storage. Particularly, memory resources are saved because the size of the page table is inversely proportional to the page size, and thus a larger page size means a smaller table. Also, transferring larger pages is more efficient that transferring smaller pages. For example, the page size for the Intel 80386 and i486™ microprocessor is 4 Kbytes.

Most microprocessors employ a combination of segmentation and paging; specifically, each segment includes a number of pages. This approach to memory management is termed "paged segmentation". Such a system is disclosed in U.S. Pat. No. 4,972,338, entitled "Memory Management For Microprocessor System" issued to Crawford et al., which discloses a segmentation mechanism for translating a virtual memory address to a second memory address (linear address) that is applied to a two-level paging table to select a page frame. The Crawford et al. invention is embodied in the Intel 80386 microprocessor.

Briefly, as described in the Crawford et al. patent, segmentation translates a 48-bit virtual address to a 32-bit linear (intermediate) address. The virtual address includes a segment selector (14 bits) and segment offset (32 bits). Segment offset is the calculated result of the address calculation: scale index and the displacement. The segment selector comes from the segment register. The application programmer must specify a segment register and other components that give the offset. Most applications use only one segment.

FIG. 1 is an illustration of page translation in Intel 80386 microprocessor and the Intel i486™ microprocessor. A linear address including a page directory field, a page table field, and an offset field are applied to obtain an operand in a page frame. Within the computer memory, the data structures include page directories, page tables, and page frames. In operation, a page directory in memory is first chosen by a control register CR3. In the linear address, the page directory field selects a page directory entry that specifies a page table in physical memory. The page table field of the linear address selects a page table entry that specifies a page frame of data in physical memory. The offset field of the linear address is applied to select an operand within the page frame. Thus, page translation for the Intel i486™ uses a tree structure with two levels of tables in memory.

Each of the tables occupies a 4 Kbyte block of physical memory and each entry is 4 bytes. Therefore each page directory address table has 1K 4-byte entries. The directory field of the linear address is a 10-bit index that selects one of the 1K entries in memory. Similarly, the page table has 1K 4-byte entries that are selected by the 10-bit page table field of the linear address. The 12-bit offset field of the linear address is applied directly to select any operand in the 4K bytes in the page frame. The page frame address is 20 bits in memory. With the 12 bit offset of the linear address, the translation provides a 32-bit physical address, which can access up to 4 Gbytes of physical memory.

Although large by past standards, a 4 Gbyte limit on physical memory is becoming a limitation, particularly for very large servers. For example, banking databases that store customer information may require tens of Gbytes. It would be an advantage to provide a memory management system that is compatible with 32-bit existing software for the 386 and i486™, and can access more than 4 Gbytes, for example up to 64 bits ($1.8 \times 10^{10}$ Gbytes). It would be a performance advantage if the memory access to this larger physical memory could be completed in the same, or a lesser amount of time. It would be another advantage if more than one page size could be selected to choose a page size corresponding to an efficient memory structure for a particular application program or type of data structure.

SUMMARY OF THE INVENTION

The present invention provides an address translator and a method for translating a linear address into a physical address for memory management in a computer. Different page sizes can be selected, and the address translator translates the selected page size. The address translator translates from a standard 32-bit linear address for compatibility with previous architectures. However, the translator can translate to a physical address that is larger than the linear address; i.e., greater than 32 bits (e.g., 36 bits). Translation occurs with no decrease in performance, i.e., no increase in access time. In alternative embodiments, the address translator can be expanded to accommodate greatly increased physical memory while retaining the ability to run pre-existing software. For example, the physical address of the preferred embodiment can be expanded to meet a new IEEE standard which requires a 64-bit physical address. Even with such a large physical address, compatibility is retained with systems that use a 32-bit physical address.

The apparatus of the present invention includes a memory management address translator for addressing a page frame of main memory using another computer supplied address. In the preferred embodiment, the translator translates a linear address supplied by a microprocessor in a computer that uses segmentation methods to obtain the linear address by translating a virtual address. However, it should be apparent to one skilled in the art that, in other computer architectures, the translator of the present invention could translate a computer supplied address obtained by another method.

The linear address that is applied to the translator includes an offset and a plurality of fields used to select entries in a plurality of tables. The tables include a directory pointer table that includes a group of directory pointers, a plurality of page table directories each of which includes a group of page directory entries, and a plurality of page tables each of which includes a group of page table entries. The size of the entries in the page table directory is dependent upon the selected memory size, and is either 32-bits or 64-bits in the preferred embodiment. A first field of the linear address specifies a directory pointer in the directory pointer table, so that a directory pointer is selected that specifies a page directory table. A second field of the linear address specifies a page directory entry in the selected page directory table. A third field of the linear address specifies a page table entry so that a page frame in physical memory is selected.

The contents of the tables are stored in any suitable memory component such as main memory. The page table directories and the page tables are stored in main memory and accessed through a conventional memory access. In the preferred embodiment, the pointer table is stored in both main memory and in dedicated pointer table registers provided in the microprocessor. Preferably, the pointer table registers are invisible (i.e. not accessible) to a computer programmer, so that the registers cannot be written to or read directly by the programmer. A performance advantage is provided by the use of registers for the directory pointer table because a memory access is avoided.

In comparison to the memory management system of the i486™ microprocessor, the address translator described herein includes the directory pointer table in addition to the page table directories and the page tables. As a further feature, the directory pointer table is in main memory and also in dedicated on-chip registers. Register storage avoids one memory access for each translation, so that accessing the three tables to translate an address requires only two memory accesses at most, thereby saving computer time. Only one page size was supported on the i486™ microprocessor, but in the present invention, more than one page size is available. The size of the linear address remains 32 bits, however the table structure allows the physical address to be larger. For example, with extended addressing the physical address may be 36 bits (64 GB) and can be larger, 64 bits for example. The same size linear address permits present operating systems to take immediate advantage of extended physical addressing without change to their system software.

A larger page size can provide performance advantages in some instances, particularly for large amounts of contiguous data, by reducing the miss rate of the Translation Lookaside Buffer (TLB). With a larger page size, a single TLB entry can be used to access all the locations in the large page instead of using separate entries for accessing each small page. The single TLB entry for a large page saves time by avoiding the multiple TLB accesses that would occur if a small page size were used. Larger page sizes are useful, for example, in mapping memory-resident portions of the operating system, video display frame buffers, databases, and other large data structures. A large page size allows efficient reading and storing of these data structures.

In memory, a page is defined by a page frame that has boundaries set by its size. For example, a 4 Kbyte page has boundaries at each 4 Kbyte memory boundary, and a 2 Mbyte page has boundaries at each 2 Mbyte memory boundary. As discussed above, the address translator supports multiple page sizes; i.e. multiple page frame sizes. A single program may use multiple page sizes. The supported page frame sizes include: a first page frame size and a larger, second page frame size. The linear address includes a plurality of fields including selection fields and an offset field. The number and width of the selection fields is dependent upon the selected page frame size. For the first page frame size, the selection fields include a first selection field, a second selection field, and a third selection field. For a second page frame size, the selection fields include only a first selection field. For a second page frame laze with extended physical addressing, a second selection field is used in addition to the first selection field.

If the first page size is selected, then all three tables are used to translate a linear address to a physical address. However, if the second, larger page size is selected, then at least one of the tables is omitted. In the preferred embodiment with the normal addressing mode, the page tables and the pointer table are not used, and instead, the page directory entry points directly to the larger page fame. With extended physical addressing, the pointer tables and the page directory tables are used, but the page tables are not used and the page directory entry has a larger size and points direly to the larger page frame.

When the first page size is selected so that the linear address includes the first, the second, and the third selection field, the first selection field selects a directory pointer entry to select a directory table, the second selection field selects a selected page directory entry from the selected page directory table to select a page table, and the third selection field selects a page frame address from the selected page table. When the second page size and normal addressing is selected so that the linear address comprises only a first selection field and an offset field, the control register selects a page directory, and the first selection field points to a page frame. When the second page size and extended physical addressing is selected so that the linear address comprises a first field and a second field, the first selection field of the linear address selects a directory pointer to select a page directory table, and the second selection field selects a page frame from the selected page directory table.

In terms of a method, the present invention includes an address translation method for translating a linear address into a physical address. The translation method varies dependent upon page size and size of the physical address. Thus, two selections are made initially. A first selection selects either a small or a large page size. A second selection selects either normal addressing or extended physical addressing. The format of the linear address is selected to correspond to the selected page size although preferably the linear address size remains unchanged.

For the small page size in the described embodiment, the linear address has a pointer field, a directory field, a page field, and an offset field. The translation method for the small page size comprises the steps of applying the pointer field to select a directory pointer, applying the selected directory pointer to select a page directory, applying the page directory field to the selected page directory table to select a page table, applying the page table field to the selected page table to select a page frame address, and applying the page frame address and the offset field to provide a physical address.

If the second page size and normal addressing has been selected, then the second page size translation includes applying a control register to select a page directory, applying the first selection field in the linear address to the page directory to select a page frame, and applying the offset to select a particular operand. If the second page size and extended physical addressing has been selected, then the second page size translation method includes the steps of applying a directory pointer field to select a directory pointer, using the selected directory pointer to select a page directory, applying the page directory field to said selected page directory table to select a page frame address, and using the page frame address and the offset field to provide a physical address.

BRIEF DESCRIPTION OF THE DRAWINGS

FIG. 5 is a diagram of a control register, a page directory entry, and a page table entry for a normal physical address space and a single page size that is the original and default mode for the Intel 80X86 family.

FIG. 6 is a diagram of a control register, a page directory entry, and a page table entry for a normal physical address space and a small page size.

DETAILED DESCRIPTION OF THE PREFERRED EMBODIMENT OF THE INVENTION

Figure 1:
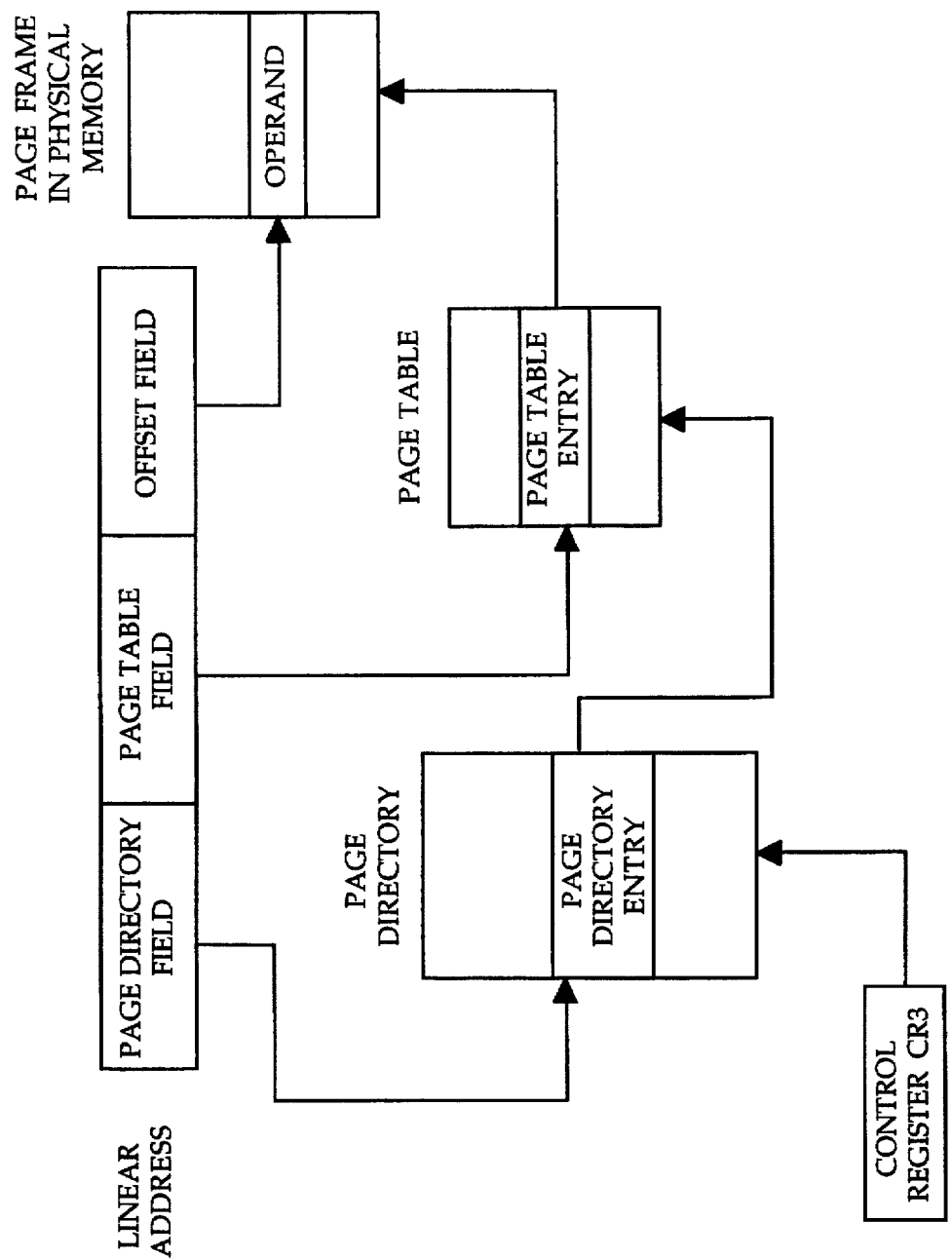
FIG. 1 is a diagrammatic illustration of page translation for the i486™ microprocessor.

The invention may be understood by reference to the following detailed description of the preferred embodiment and the figures wherein like parts are designated with like numerals throughout.

The preferred embodiment of the present invention includes a plurality of page tables at different levels whose structure and addressing is dependent upon the chosen page size and the number of physical address bits that are desired for the physical address. In the preferred embodiment, the tables are stored in digital form in memory, except where otherwise noted. The circuits necessary to perform the processing to be described can be implemented using a finite state machine, for example a programmable logic array (PLA), and other conventional logic.

Table 1, shown below, discloses features of the preferred embodiment. Specifically, Table 1 discloses selection of the page size and the size of the physical address. In the preferred embodiment, selection is controlled by two control bits in a control register (CR4). The two control bits are termed the "PAE" bit and the "PSE" bit.

TABLE 1

Memory Management Features Controlled by PSE and PAE

| Control Bits | | Features Available | |
|---|---|---|---|
| PAE | PSE | Page Sizes | Physical Address Bits |
| 0 | 0 | 4KB | 32 |
| 0 | 1 | 4KB or 4MB | 32 |
| 1 | 0 | 4KB or 2MB | 36 |
| 1 | 1 | 4KB or 2MB | 36 |

The address mode is selected by the PAE bit. If PAE is "0" then normal 32-bit addressing is selected. If PAE is "1", then extended physical addressing is selected.

If PAE and PSE are both zero, then the page size is 4 KB and the physical address is 32-bits. This configuration is compatible with memory management in microprocessors including the Intel 80386 microprocessor and the 80486 microprocessor, both of which are commercially available and in wide use. Thus, software written for those microprocessors can be run with the memory management of the preferred embodiment, with PAE and PSE both set to zero.

If PAE is zero and PSE is set to one, then the size of the physical address is again 32-bits. However, the page size may be either 4 KB or 4 MB, depending upon a control bit in the page directory entry to be described below. The larger page size may be useful in applications where large blocks of memory are stored together, for example, video memory. In such an instance, the program sets the control bit when the page directory entry is entered into the directory.

If PAE is one and PSE is either set to one or reset to zero (i.e., "don't care"), then the physical address is extended to 36-bits, and the page size may be either 4 KB or 2 MB, depending upon a control bit in the page directory entry to be described. The 36-bit address provides extended addressing capabilities (64 Gbytes in the preferred embodiment) to address more memory than commercially available microprocessors including the Intel 80386 microprocessor and the 80486 microprocessor.

The above description and Table 1 show specific parameters applicable to the preferred embodiment of the invention. In other embodiments, the page size may be different, the number of control bits may be more or less, and the size of the physical address may be different. The smaller physical address size can be chosen to be compatible with prior art microprocessors, and the larger physical address size can be chosen for use with larger memory. In the preferred embodiment, the size of the physical address can be expanded by simply utilizing bits that are currently not utilized in the embodiment described herein. The physical address of 32-bits can address each memory block in a 4 GByte physical memory, while the extended physical address of 36-bits can address each memory block in a 64 GByte physical memory.

In the preferred embodiment, the physical address is translated from a linear address supplied by a microprocessor. In the preferred embodiment, the linear address is supplied by applying segmentation to a virtual address, however it will be apparent to one skilled in the art that the linear address may be supplied using other methods. The linear address is divided into fields used to translate the linear address into a physical address. Both the number of fields in the linear address, and the size of the fields may vary dependent upon the selected page size and physical address size, as will be described. In the preferred embodiment, the number of fields and their size are both dependent upon the control parameters shown in Table 1, specifically, the PAE and PSE control bits, which specify the page size and the physical address size.

For page translation using a small 4K page size and a normal physical address space (4 GByte or less), the translation configuration is similar to that shown in FIG. 1, used in the Intel 80386 and 80486. That configuration is well known and described in many books, for example "Programming the 80386", by John H. Crawford and Patrick P. Gelsinger, Sybex, San Francisco, 1987.

Figure 2:
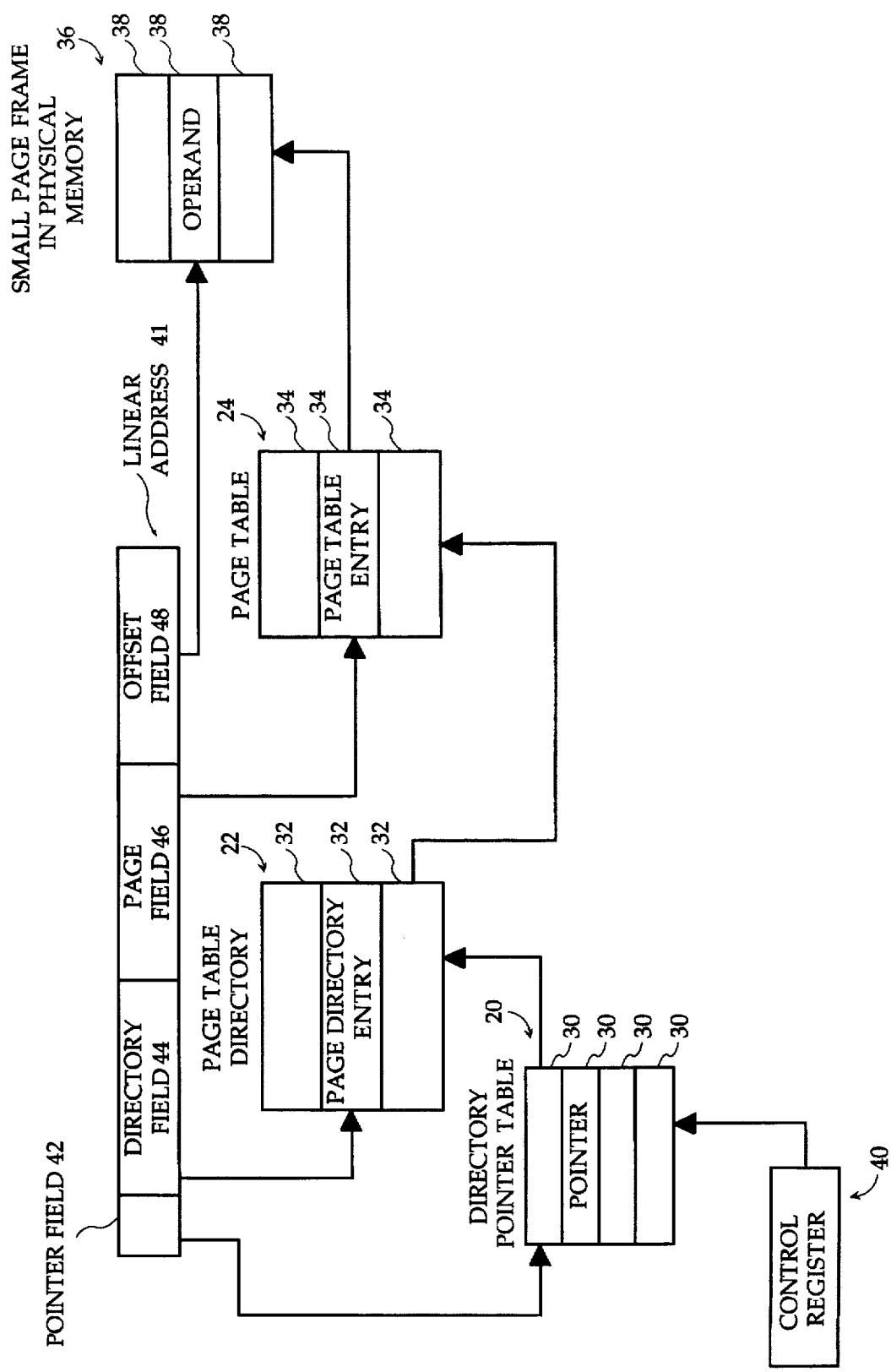
FIG. 2 is a diagrammatic illustration of page translation for the translator of the present invention when a small page frame size and extended addressing has been selected.

Reference is made to FIG. 2 which is an illustration of page translation for a small page size and an extended physical memory. In the preferred embodiment, the small page size is 4 KB and the extended physical memory is 64 GByte or less. For the small page size and extended physical memory, three levels of tables are used. These three levels include a directory pointer table 20, a page table directory 22 and a page table 24. The directory pointer table 20 includes a plurality of pointer entries 30, the page table directory 22 includes a plurality of page directory entries 32, and the page table 24 includes a plurality of page table entries 34. A page frame 36 represents a block of data in memory having a size determined by the page directory entry 32, and by the PAE and PSE bits as described above with reference to Table 1. Each page frame 36 includes a plurality of operands 38 that are selected in a manner described below.

In order to access an operand, a control register 40 holds a value that points to the address of a particular directory pointer table 20 in memory. In the preferred embodiment, the directory pointer table 20 is actually stored in the microprocessor in dedicated registers, as will be described below. A linear address 41 for a small page size is divided into a pointer field 42, a directory field 44, a page field 46, and an offset field 48.

The pointer field 42 points to a particular pointer 30 in the directory pointer table 20 that is selected by the control register 40. In the preferred embodiment, the directory pointer table 20 includes four entries, and the pointer field 42 therefore includes 2-bits. The selected pointer 30 is applied to select a particular page table directory 22. Once the page table directory 22 is selected, a directory field 44 of the linear address selects a particular page directory entry 32. The selected page directory entry 32 points to one of the plurality of page tables 24. A page field 46 within the linear address selects a particular page table entry 34 in the selected page table 24. The selected page table entry 34 selects a page frame 36 in physical memory. The offset field 48 in the linear address points to an operand 38 in the specified page frame 36 in physical memory.

Figure 3:
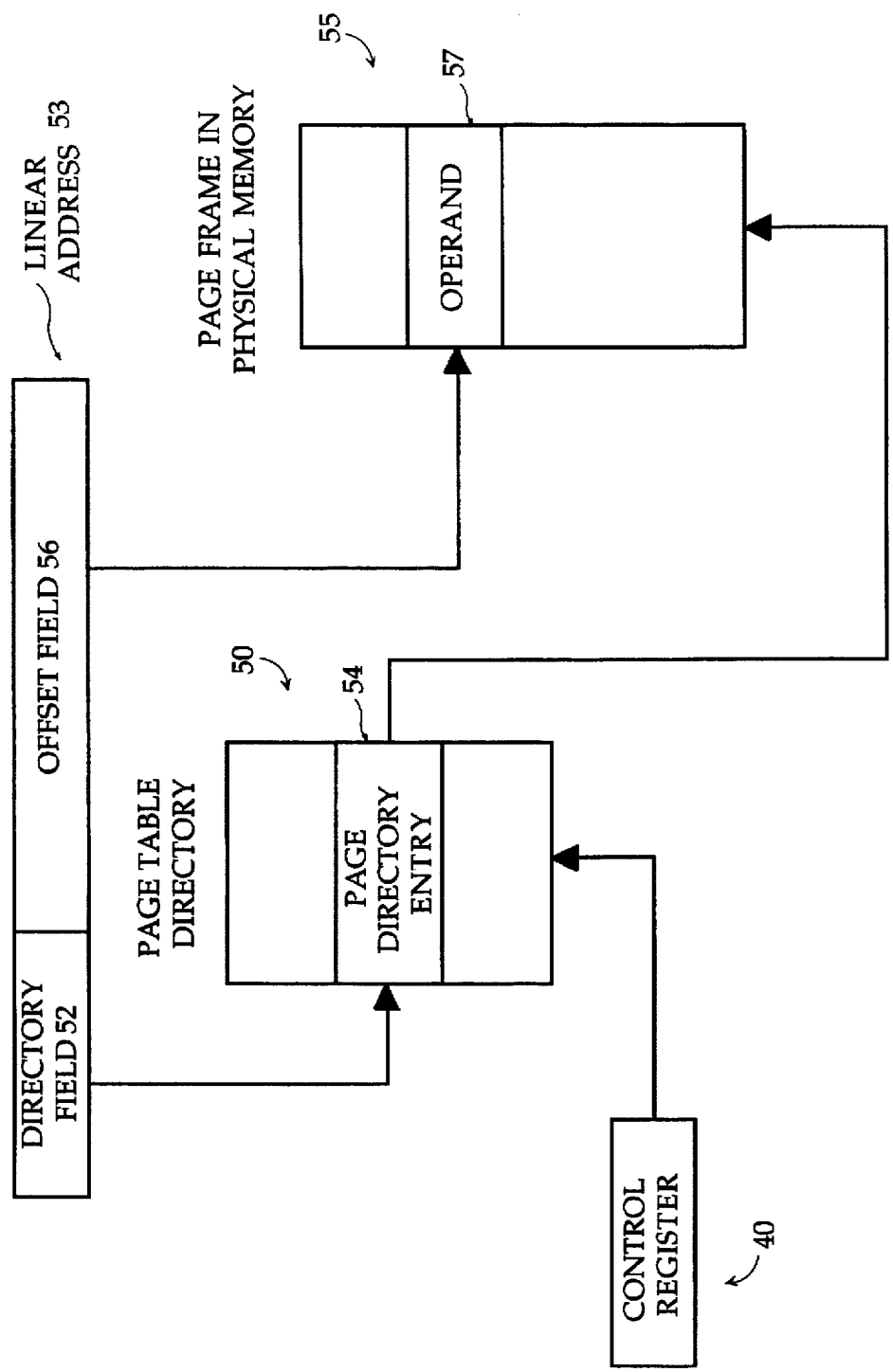
FIG. 3 is a diagrammatic illustration of page translation for the translator of the present invention when a large page frame size and normal addressing has been selected.

Reference is made to FIG. 3 which is an illustration of page translation for a larger (4 MB) page size with a normal size (4 GByte or less) physical memory. For translating the large page size, only one table level is used in place of the three levels of tables for the smaller size page as discussed previously with regard to FIG. 2. The control register 40 points directly to a page table directory 50. A directory field 52 in a linear address 53 points to a particular entry in the page directory. The format of the page directory entry will be described below. The selected page directory entry 54 points to a page frame 55 in physical memory. An offset field 56 in the linear address points to a particular operand 57 within the page frame 55.

Figure 4:
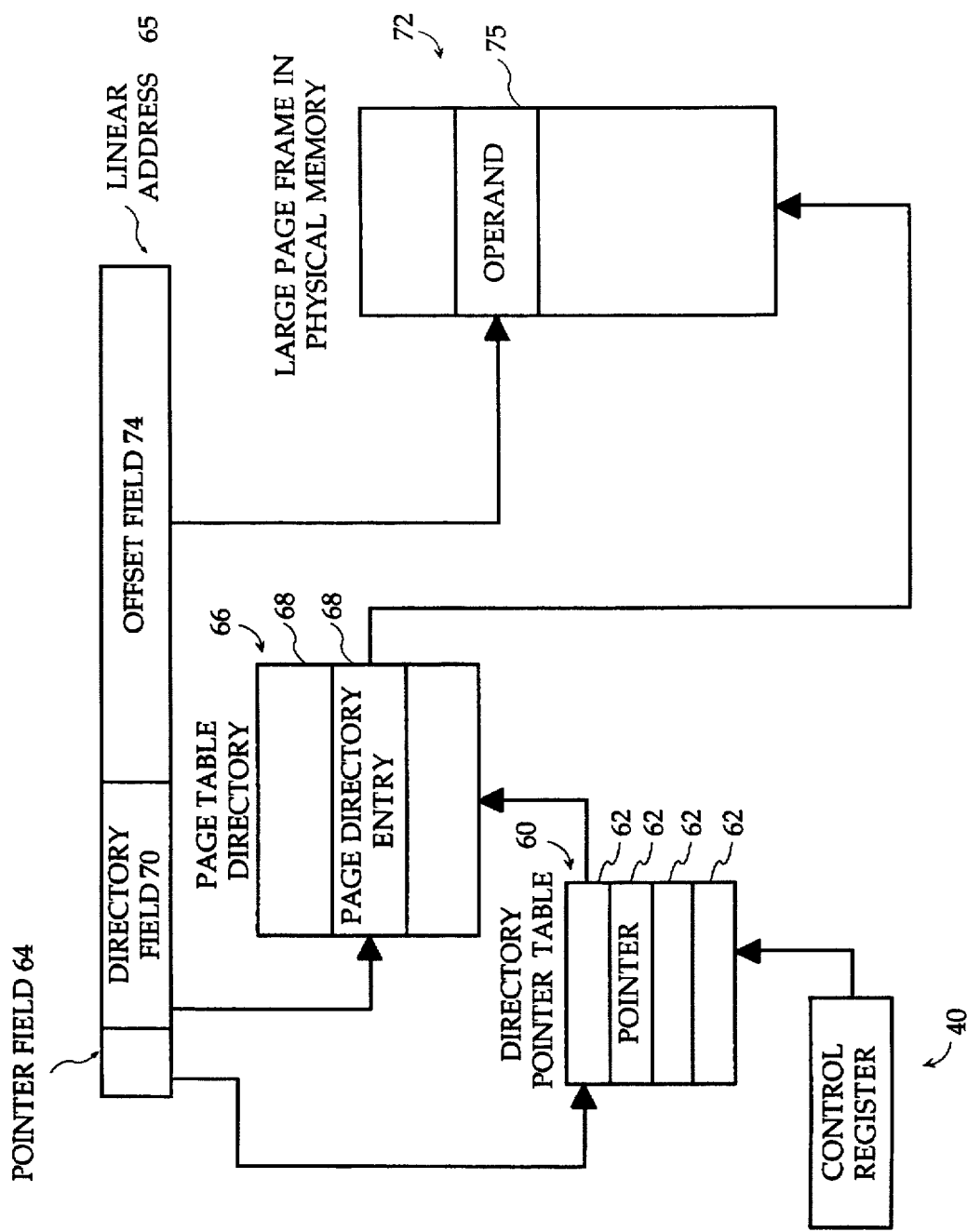
FIG. 4 is a diagrammatic illustration of page translation for the translator of the present invention when a large page frame size and extended physical addressing has been selected.

Reference is made to FIG. 4 which is a configuration for pointing to a large page frame in physical memory. The embodiment of FIG. 4 is useful in the preferred embodiment for extended addressing (64 GBytes or less). In other words, when a larger physical memory is provided, the embodiment of FIG. 4 provides additional information necessary to access the data within the larger physical memory. In the configuration of FIG. 4, two levels of tables are used, with the first level of tables being a directory pointer table 60. The control register 40 selects a directory pointer table 60 that includes a plurality of pointers 62. The format of the pointer will be described below. A pointer field 64 within a linear address 65 points to a particular pointer 62. The selected pointer points to a page table directory 66 resident within memory. A plurality of page directory entries 68 are included within the page table directory 66. The format of the page directories entries 68 will be described below. A directory field 70 within the linear address points to a particular page directory entry 68, which in turn selects a particular page frame 72 in physical memory. An offset field 74 in the linear address selects a particular operand 75 within the page frame 72. In the preferred embodiment, the size of the page frame 72 for extended addressing is 2 MB.

TABLE 2

Memory Management Types and Modes Run

Figure 7:
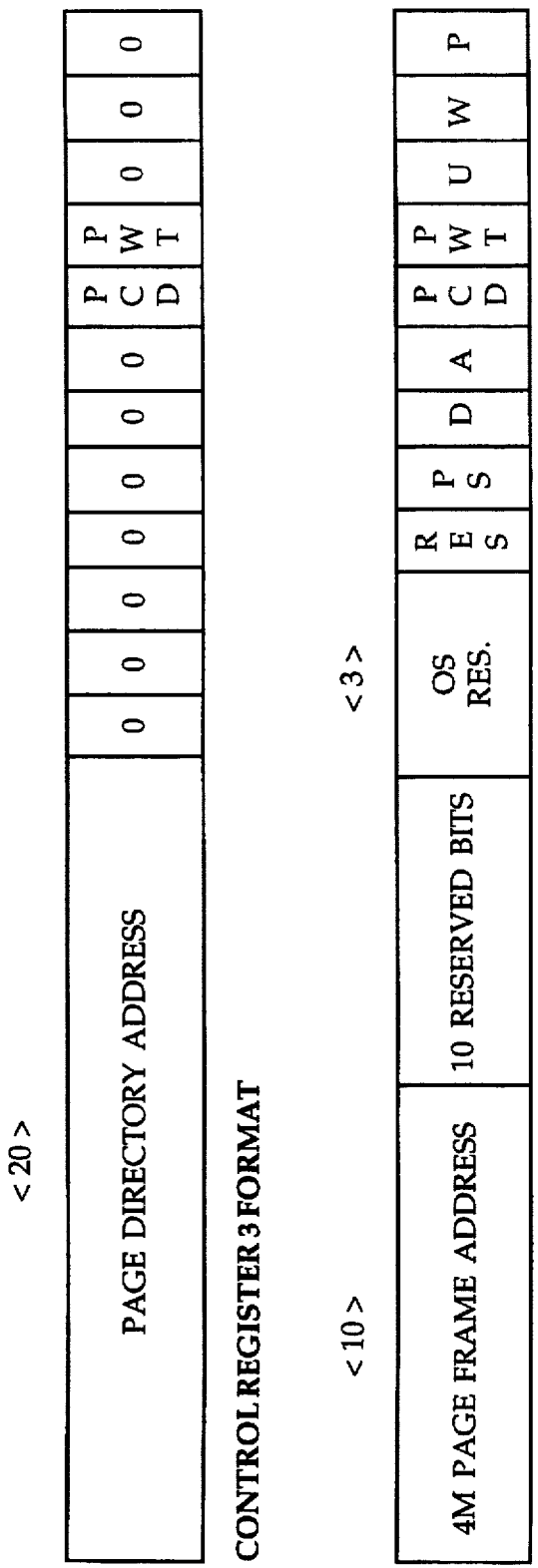
FIG. 7 is a diagram of a control register and a page directory entry for a normal physical address space and a large page size.
Figure 8:
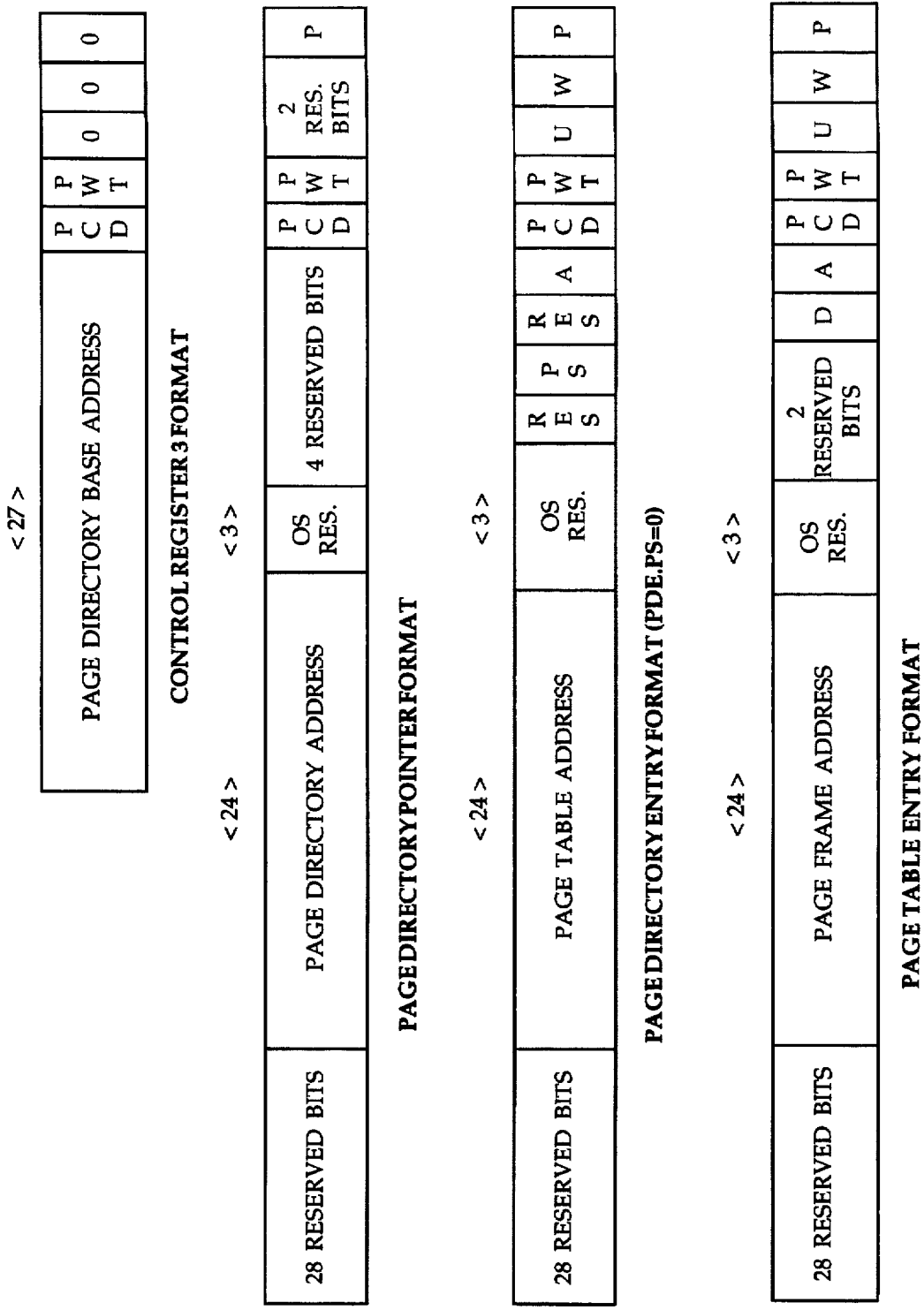
FIG. 8 is a diagram of a control register, a page directory pointer, a page directory entry, and a page table entry for an extended physical address space and a small page size.
Figure 9:
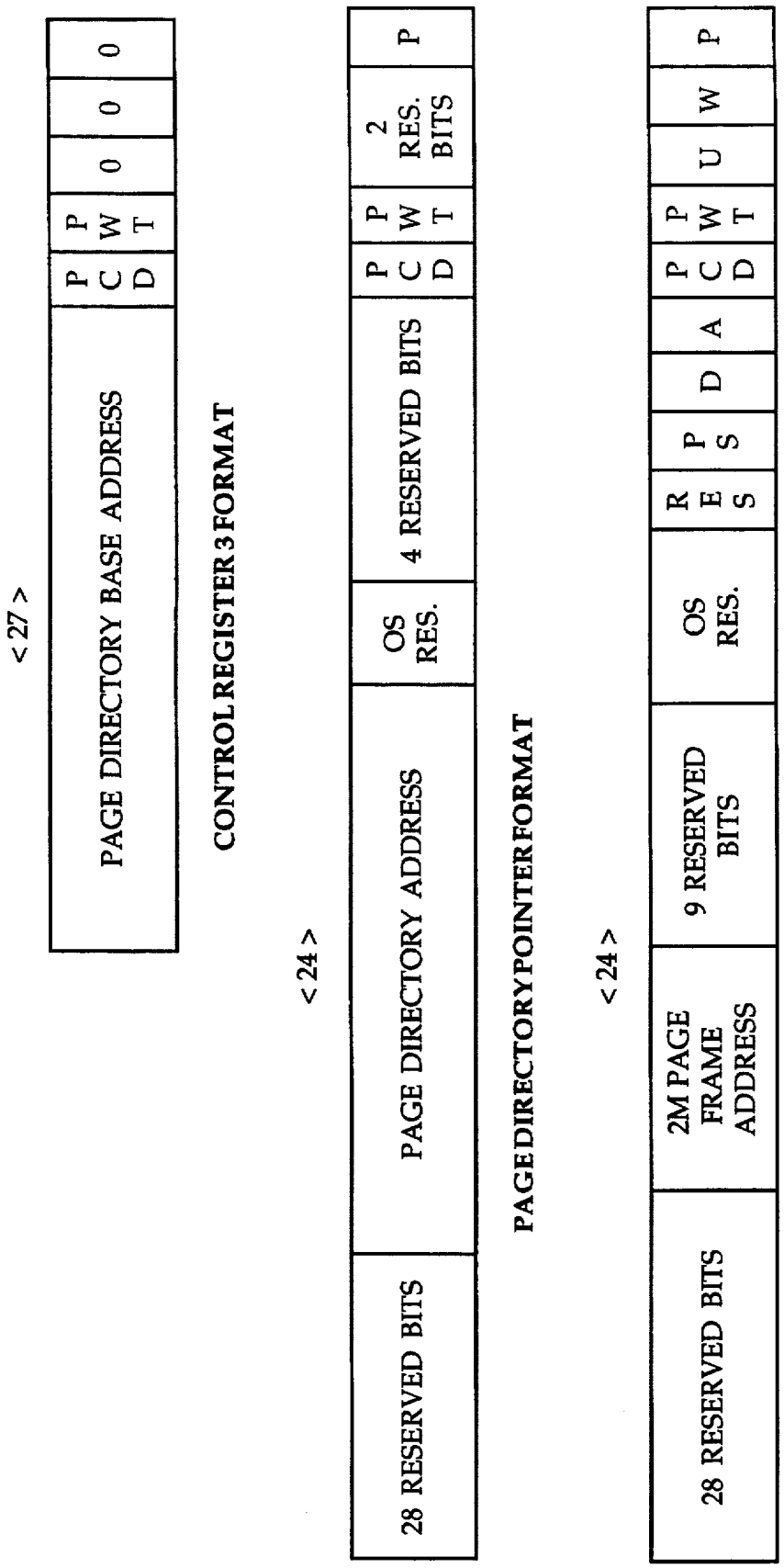
FIG. 9 is a diagram of a control register, a page directory pointer, and a page directory entry for an extended physical address space and a large page size.

| Type | CR4 PAE | CR4 PSE | DIR PS | RE- LATED FIG. | PAGE SIZE (Bytes) | PHYSICAL ADDRESS | MODE |
|---|---|---|---|---|---|---|---|
| 0 | 0 | 0 | X | FIG. 5 | 4K | Normal (32-bit) | A (Def) |
| 1 | 0 | 1 | 0 | FIG. 6 | 4K | Normal (32-bit) | B |
| 2 | 0 | 1 | 1 | FIG. 7 | 4M | Normal (32-bit) | B |
| 3 | 1 | X | 0 | FIG. 8 | 4K | Extended (36-bit) | C |
| 4 | 1 | X | 1 | FIG. 9 | 2M | Extended (36-bit) | C |

For a more detailed description of the preferred embodiment, Table 2 sets forth memory management types and the modes that are run. Mode A is the default mode. This is the mode that is compatible with all other members of the X86 family of microprocessors, including the Intel 80386 and the Intel 80486 microprocessors. Mode B represents normal addressing (<4 GByte) and a capability for selecting one or two page sizes. Mode C represents extended addressing (a larger physical memory) and a capability for selecting one or two page sizes. Memory management for these modes has been discussed with reference to FIGS. 1–4. Each of these modes will be discussed further with regard to specific entries In the tables that are used in the preferred embodiment. These entries are specified as "Related Figures" in Table 2. It should be apparent to one skilled in the art that the specific arrangement of bits and the number of bits may vary between embodiments. In other embodiments, the actual page size for example may be different, or the physical address size may be different. FIGS. 5–9 are provided in order to comply with the full disclosure and provide an exemplary arrangement for implementing dual page size and extended physical addressing. Many of the bits and bit names have been used for Intel's i486™ microprocessor, and are described in detail in the "i486™ Microprogrammer's Reference Manual", particularly at Section 5.3.3, available from Intel Corporation of Santa Clara, Calif.

Reference is made to FIG. 5 which illustrates the format of the registers and table entries pertinent to operation in Mode A. Mode A is the original and default type of the X86 family. It maps a standard 4K-byte page within a 32-bit physical address space. The look-up tables include both a page directory and a page table directory.

The page directory entry is 4 bytes wide and thus requires 30 bits to specify a unique address. The first 20 bits point to the page directory and will come from bits 31:12 of CR3. The offset within the page directory will come from the ten most significant bits of the linear address (31:22). One 4K-byte page can therefore fit 1K of 4-byte entries.

The details of operation in the default mode are well known with respect to Intel's 80386 and 80486 microprocessors and will not be repeated here. Reference is made to FIG. 1, which shows the table configuration that is implemented with the control register and table entries shown in FIG. 5.

Reference is now made to FIG. 6 which is a depiction of the format of the control register and the table entries. The look-up sequence for type 1 is virtually identical to that described for type 0 with two minor exceptions: the reserved (RSV) bits are checked for zero as soon as the P bit is validated, and the bit PDE.PS (Page Directory Entry Page Size) is zero for a small page size in type 1. (For a large page size, PDE.PS=1 which is type 2.) The table configuration for type 0 shown in FIG. 1 is also the table configuration for type 1.

Reference is made to FIG. 7 which is a depiction of the control register and the page directory entry for a large page size and a normal physical address space. The control register entries shown in FIG. 7 implement the table structure illustrated in FIG. 3. Type 2 results in a Translation Lookaside Buffer (TLB) entry that maps a 4 Mbyte page within a 32-bit physical address space. The look-up involves only a page directory entry as illustrated in FIG. 3.

The page directory entry (PDE) is retrieved and deemed valid in exactly the same way as the PDE of type 1. In this type of look-up the PDE.PS bit will be found set, thus no table look-up will take place. From this point on, the bit checking of the PDE will be virtually identical to the bit checking of the page table entry (PTE) of type 1. The only difference is that the U and W statuses are the PDE.U and PDE.W bits themselves.

Reference is made to FIG. 8 which illustrates the format for the control register and the table entries, particularly the page directory pointer format and the page directory entry format. Reference is also made to FIG. 2, which is implemented with the formats shown in FIG. 8.

The type 3 and extended addressing Mode C results in a TLB entry able to map a 4K-byte page within a 36-bit physical address space. The look-up uses a page directory pointer, a page directory entry, and a page table entry. There are four page directory pointers (PDPTR (3–0), located physically in registers within the P-unit. The page directory pointers are stored there by microcode when CR4.PAE is set, as part of a write to control register 3. The particular page directory pointer to look-up is selected by bits 31:30 of the linear address. The P bit is checked, to see that it points to a valid page directory, and then the RSV bits of the pointer are verified to be zero. If the RSV bits are not all zero a page fault is returned.

Within this Mode C, the PDE is eight bytes wide and thus requires 33 bits to specify a unique address. The first 24 bits point to the page directory and come from the selected page directory pointer bits 35:12. The particular page directory entry is selected from the linear address bits 29:21. Within one 4K-byte page, 512 eight byte entries can fit. The bit checks of the PDE are handled in the same fashion as those of the PDE for type 1, with the main difference being that there are 28 more RSV bits.

The page table entry (PTE) is also eight bytes wide and accessed similarly to the PDE. The only difference is that the page table is at bits 35:12 of the PDE in the offset is in the linear address bits 20:12. Similarly, the bit checks of the PTE are handled similarly as the PTE of type 1, with the main difference being that there are 28 more RSV bits. The TLB entry for Mode C occupies the full Translation Lookaside Buffer of 36 bits.

Reference is made to FIG. 9 which depicts the format of the control register and the entries into the page directories and the page directory pointers. These register formats implement the embodiment of FIG. 4, for the extended physical addressing and a large page size. Specifically, type 4 and mode C results in a TLB entry able to map a 2M-byte page within a 36-bit physical address space. The look-up involves selection of a pointer from the page directory pointers, which select a particular page directory as illustrated in FIG. 4.

The PDE is retrieved and deemed valid in exactly the same way as the PDE of type 3. In this type of look-up the PDE.PS bit will be found set, thus no table look-up will take place. From this point on the bit checking of the PDE will be virtually identical to the bit checking of the PTE of type 3. The main difference is that the U and W statuses are the PDE.U and the PDE.W bits themselves.

In order to implement extended physical addressing, it should be apparent that the buses and particularly the TLB and the TLB bus be able to support the size of the extended physical address. In the preferred embodiment, the size of the physical address is 36 bits, and therefore the TLB and the TLB bus are implemented to store and communicate this size physical address.

Figure 10:
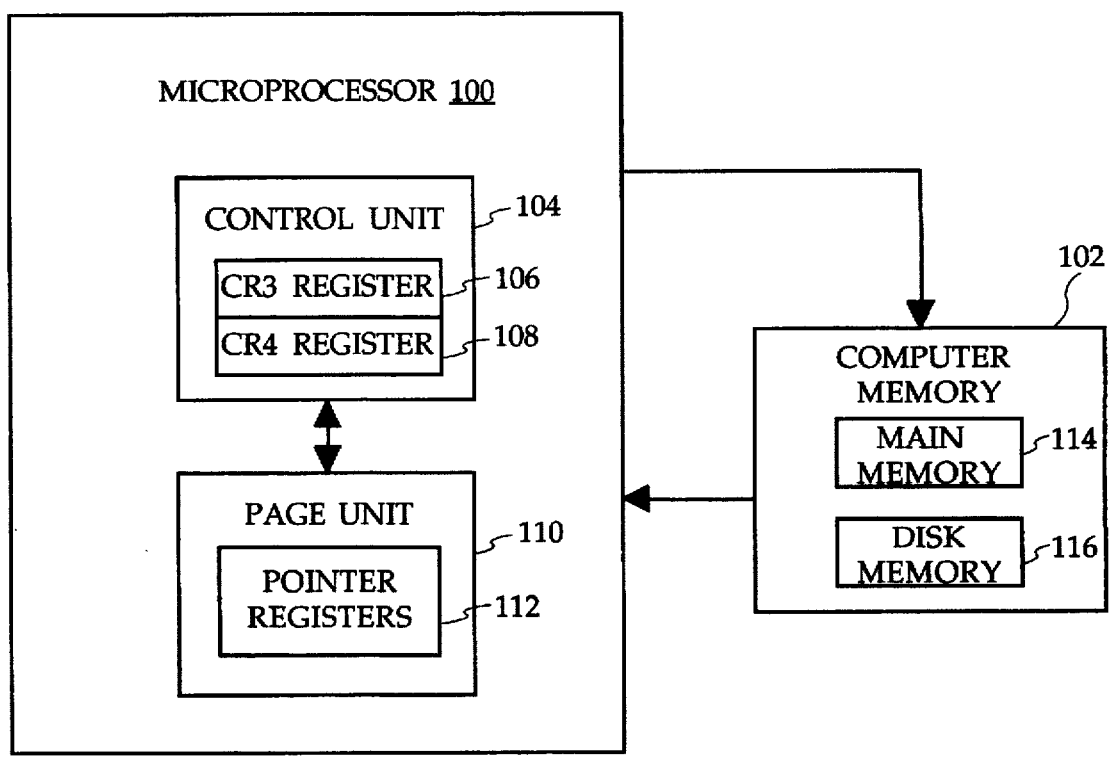
FIG. 10 is a block diagram of a portion of the microprocessor and its connection to memory elements.

Reference is made to FIG. 10, which is an illustration of the relationship between a microprocessor 100 and a computer memory 102. The microprocessor includes a control unit 104 which has numerous registers provided therein including a CR3 register 106 and a CR4 register 108. The microprocessor 100 also includes a page unit 110 which includes logic and additional circuitry including hardware, PLA programming sequencing control, and pointer registers 112. The page unit 110, sometimes referred to as the "P-unit," controls the address translation as described above. For example, the P-unit controls all table manipulations and directs transfers with main memory for missing TLB entries.

The computer memory 102 includes a main memory 114 that may, for example, be a Random Access Memory (RAM) that is easily accessible by a user. The computer memory 102 also may include one or more secondary memories such as a disk memory 116. A secondary memory typically requires more time for each memory access than the main memory 114. As described above, the page directories and the page tables are located in computer memory 102. The directory pointer table is also located in computer memory 102, but additionally its same entries are located within the page unit 110, specifically within the pointer registers 112. Loading the pointer registers 112 from the computer memory 102 occurs in the preferred embodiment whenever the CR3 register 106 is loaded. Because the pointers are in the registers 112, within the page unit 110 access time is substantially reduced and therefore performance is increased.

The term "physical memory" defines the physical address space seen by the operating system. The size of the physical address space is usually larger than the available main memory, but data at a specific physical address must be accessed within the main memory. A page validity bit is associated with each page table entry to indicate whether or not the page is in main memory. If the page validity bit indicates that a requested page is not in main memory, then an operating system exception is generated and the data is transferred from secondary storage to main memory. Then, the page validity bit is set to indicate that the page is now in main memory.

Figure 11:
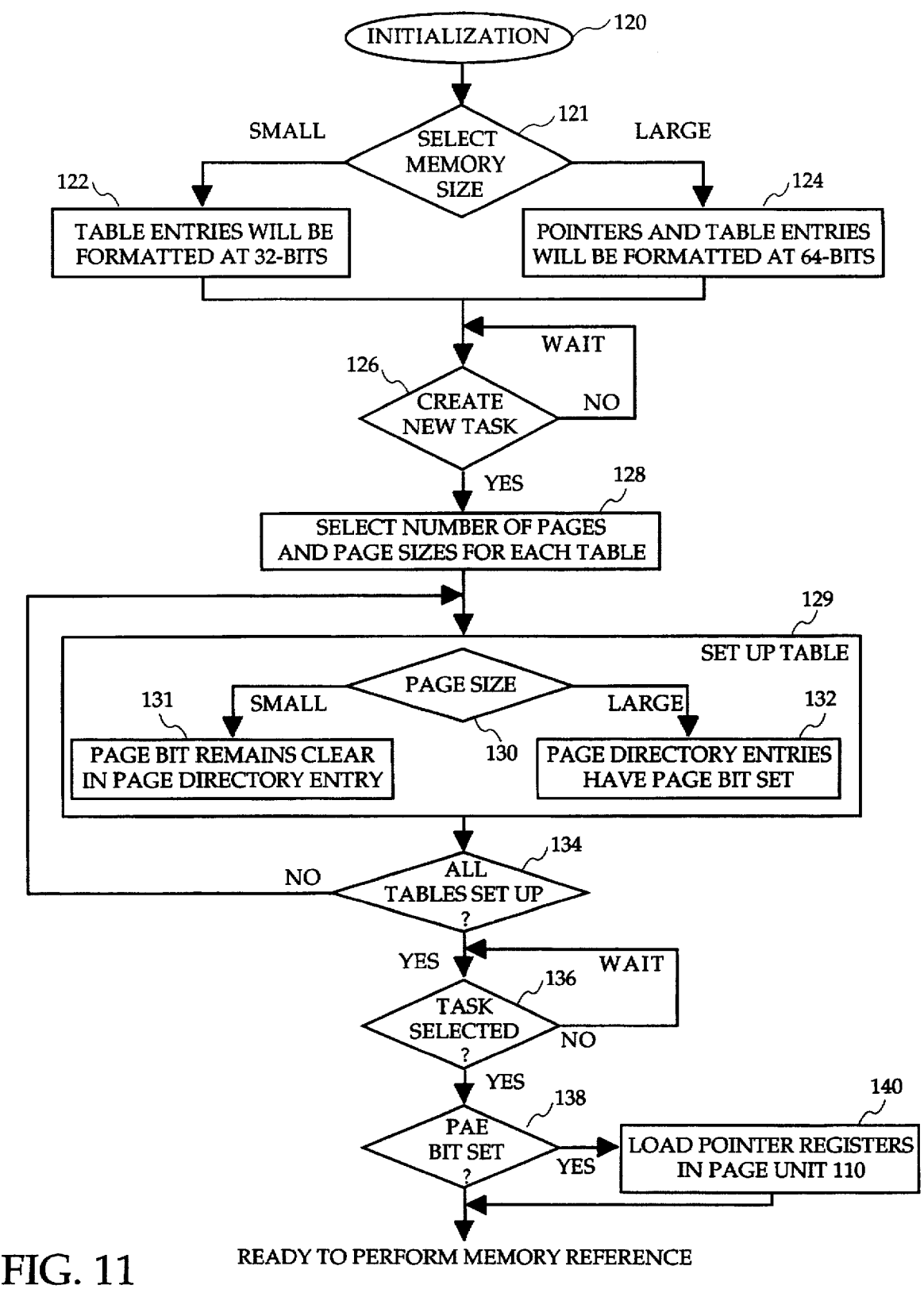
FIGS. 11 and 12 together show a flow chart of address translation for the microprocessor of the preferred embodiment, including selectable page size and memory size.
Figure 12:
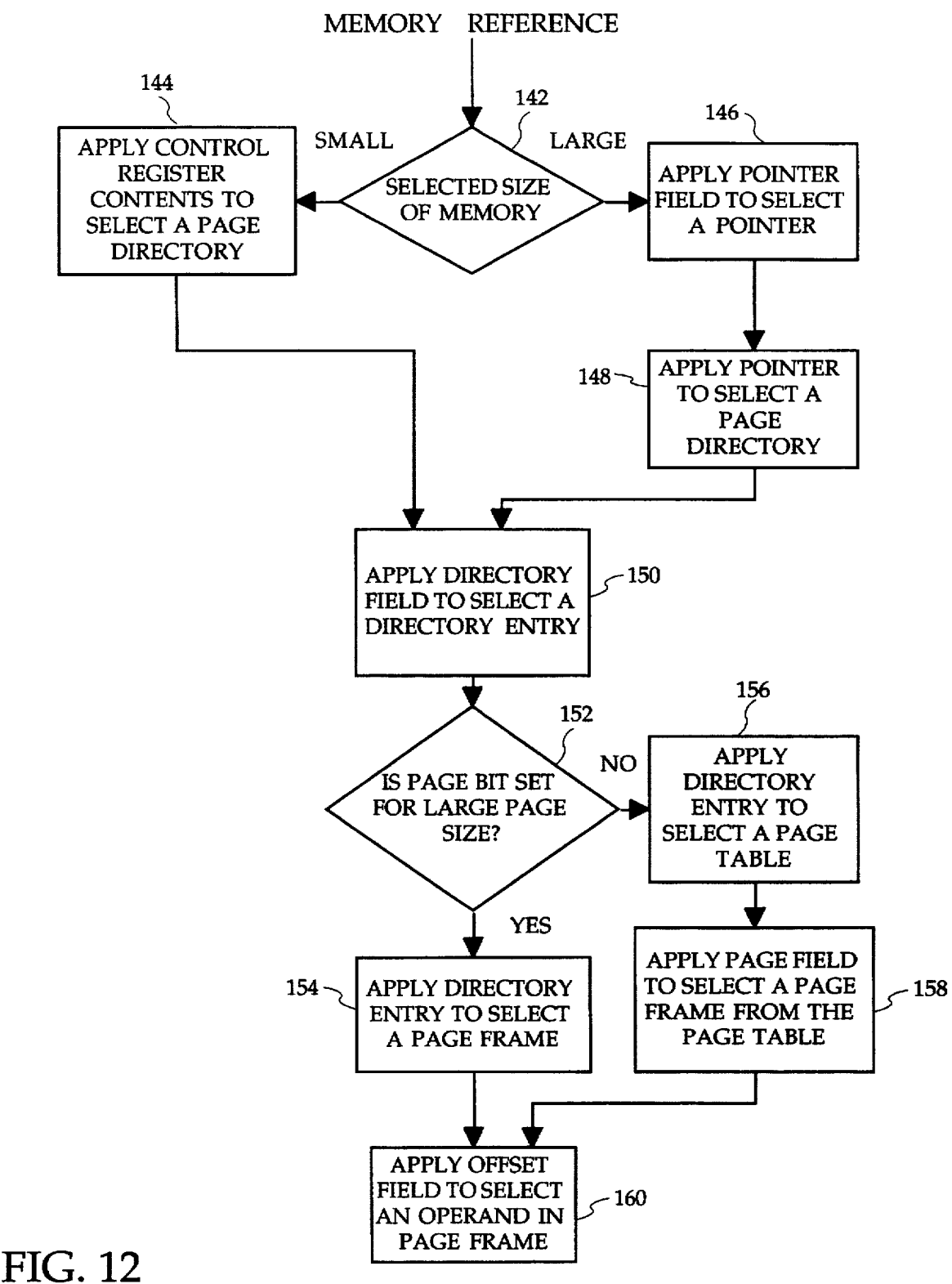

Reference is made to the flow chart of FIGS. 11 and 12, which together illustrate operation of page translation in the preferred embodiment. The flow chart of FIGS. 11 and 12 shows translation for a selectable memory size, and a selectable page size. Following initialization 120 at the top of the chart, a memory size is selected in a decision box 121. If the memory size is selected to be "small", then the table entries are formatted accordingly and set up with a size of 32 bits, as illustrated in an operation box 122. However, if a "large" memory size is selected, then the pointers and the table entries are set up to a 64-bit size, as illustrated in operation box 124. From both operation boxes 122 and 124 control flows to decision box 126. At decision box 126, a wait loop is performed until a new task is created. Whenever a new task is created, the number of pages and page sizes for each table are selected in operation box 128. Following operation box 128, each table is set up in operation box 129. Table set up includes setting the page bit based upon the selected page size.

Following the above operations, the page size is selected as illustrated in a decision box 130. If a "small" size is selected, then the page bit remains clear in the page directory entry as illustrated in a box 131. However, if a "large" page size is selected, then the page directory entries that are created have their page bit set, as illustrated in operation box 132. Upon completion of table set up in operation box 129, it is determined if all tables have been set up at decision box 134. If all the tables have not been set up for the new task, then boxes 130–132 are repeated for each table until all tables have been set up for the task.

After all the tables for the new task have been set up, a wait loop is entered at decision box 136 until the task is selected. When the task is selected, it is determined whether or not the PAE bit is set, in decision box 138. If the PAE bit is not set, then the processor is ready to perform memory reference. If the PAE bit is set, then the pointer registers are loaded into the page unit 110, in operation box 140 and the processor is ready to perform memory reference. Because the set up is now complete, the processor stands ready to request a memory reference as illustrated in a decision box 142. Moving the reference from FIG. 11 to FIG. 12 after the memory reference has been requested, the selected size of memory is reviewed as illustrated in a decision box 142. If a small size has been previously selected for the box 142; then the contents of the control register are applied to select a particular page directory, as illustrated in the operation box 144. However, if a large memory size is selected, then, as illustrated in a operation box 146, a pointer is selected by applying a pointer field of the linear address. Subsequently, as illustrated in a box 148, a page directory is selected by applying the selected pointer. After the page directory has been selected then, as illustrated in a box 150 the directory field of the linear address is applied to select a directory entry. Next, as illustrated in a decision box 152, the directory entry is checked to see whether or not the page bit has been set for a large page size. If a large page size has been selected, then the page frame is selected directly by applying the directory entry, as illustrated in a box 154. However if the page bit was not set for a large page size (i e., a small page size has been selected) then, as illustrated in a box 156 a page table is selected using the directory entry. Next, as illustrated in a box 158, the page field of the linear address is applied to the page table to select a page frame. After a page frame has been selected, either in the box 158 or the box 154, then as illustrated in the box 160 the offset field of the linear address is applied to select an operand in the page frame.

The invention may be embodied in other specific forms without departing from its spirit or essential characteristics. The described embodiment is to be considered in all respects only as illustrative and not restrictive and the scope of the invention is, therefore, indicated by the appended claims rather than by the foregoing descriptions. All changes which come within the meaning and range of equivalency of the claims are to be embraced within their scope.

What is claimed is:

1. A processor generating linear addresses having no more than N bits, said processor comprising:
   a control unit having stored therein one or more control bits; and
   a paging unit coupled to said control unit to receive said one or more control bits, said paging unit supporting translation of said linear addresses into physical addresses in a first physical address space having no more than $2^N$ locations that can be addressed while said one or more control bits are in a first state, said paging unit supporting translation of said linear addresses into physical addresses in a second physical address space having more than $2^N$ locations that can be addressed while said one or more control bits are in a second state.

2. The processor of claim 1, wherein said paging unit supports a first and second page frame size.

3. The processor of claim 2, wherein said first page frame size is 4K and said second page frame size is 2M or 4M.

4. An address translator for physical memory, said address translator translating a linear address having no more than N bits into a physical address, said address translator comprising:
   memory size selection means for selecting a physical address size to be a first address size having no more than $2^N$ locations that can be addressed or a second address size having greater than $2^N$ locations that can be addressed;
   one or more page directories, each having a group of page directory entries, said linear address having a page directory field for selecting a page directory entry;
   a plurality of page tables, each having a group of page table entries, said linear address having a format, said format selected from a plurality of predetermined formats, at least one of said plurality of predetermined formats having a page table field for selecting a page table entry; and
   means, responsive to said memory size selection means, for formatting the page table entries to a first page table entry size if the first address size has been selected or to a second page table entry size if the second address size has been selected, said second page table entry size being larger than the first page table entry size.

5. The address translator of claim 4, further comprising means, responsive to said memory size selection means, for formatting the directory entries to a first directory entry size if the first address size has been selected or to a second directory entry size if the second address size has been selected, said second directory entry size being larger than the first directory entry size.

6. The address translator of claim 4 further comprising a directory pointer table including a group of directory pointer table entries if said second address size has been selected, said format of said linear address having a pointer selection field for selecting one of said directory pointer table entries if said second address size has been selected.

7. The address translator of claim 6, further comprising a plurality of registers for holding said directory pointer table entries.

8. The address translator of claim 7, wherein the registers are dedicated for holding said directory pointer table entries.

9. The address translator of claim 6 further comprising a control register containing a value, said value for selecting a page directory from said one or more page directories if the first address size has been selected, said value for selecting said directory pointer table if the second address size has been selected.

10. The address translator of claim 4 further comprising page size selection means for selecting a page size to be a first page size or a second page size, said second page size being larger than the first, said page size selection means including a flag in each page directory entry that is indicative of the selected size of one or more corresponding pages.

11. A method for use by a processor to translate a linear address having a size of no more than N bits into a physical address, said method using a plurality of tables including one or more page directories with page directory entries and at least one page table with page table entries, said method comprising the computer implemented steps of:
   said processor altering a physical address mode indicator, said physical address mode indicator identifying said physical address size to be a first address size or a second address size, the first address size having no more than $2^N$ locations that can be addressed, the second address size having greater than $2^N$ locations that can be addressed;
   if the first address size has been selected, then said processor setting the page directory entries and the page table entries to a first entry size;
   if the second address size has been selected, then said processor setting the page directory entries and the page table entries to a second entry size that is larger than the first entry size; and
   translating said linear address into said physical address using those of said plurality of tables having a corresponding field in said linear address.

12. The address translation method of claim 11, further comprising the steps of:
   providing a flag in each page directory entry; and
   for each of said page directory entries, performing the steps of selecting a page size to be said first page size or said second page size, said second page size being larger than the first page size, and
   altering said flag to indicate said page size.

13. The address translation method of claim 12 further comprising the steps of:
   if the first address size has been selected, then applying the contents of a control register to select one of said one or more page directories; and
   if the second address size has been selected, then applying a pointer field of the linear address to select a pointer from a directory pointer table, and applying said selected pointer to select one of said one or more page directories.

14. The address translation method of claim 13, further comprising the steps of:
   applying a directory field from the linear address to select one of said page directory entries as a selected page directory entry;

testing said flag in the selected page directory entry;

if said flag in said selected page directory indicates the second page size has been selected, then applying the page directory entry to select a page frame;

if said flag in said selected page directory indicates the first page size has been selected, then applying the page directory entry to select a page table, and applying a page table field from the linear address to select a page frame from the page table; and applying an offset field from the linear address to the selected page frame to select an operand.

15. An address translation method for use by a processor to translate a linear address having no more than N bits into a physical address, said linear address having a first field and a second field, said translation method comprising the computer implemented steps of:

(a) executing one or more instructions on said processor to store a physical address mode indicator, said physical address mode indicator identifying which of a first physical address size and a second physical address size will be utilized by said processor, said first physical address size having no more than $2^N$ locations that can be addressed, said second physical address size having more than $2^N$ locations that can be addressed;

(b) said processor formatting page directory entries in one or more page directories and page table entries in a plurality of page tables to be compatible with the physical address size identified by said physical address mode indicator;

(c) if said first physical address size is identified by said physical address mode indicator, applying both a value and said first field to select a page directory entry as a selected page directory entry, wherein said value is contained in said processor and said first field is applied as a directory field;

(d) if said second physical address size is identified by said physical address mode indicator, performing the steps of (d)(1) applying both said value and a first portion of said first field to select one of a plurality of directory pointer table entries as a selected directory pointer table entry, wherein said first portion of said fist field is applied as a pointer field, (d)(2) selecting one of a plurality of page directories as said selected page directory using said selected directory pointer table entry, and (d)(3) applying a second portion of said first field as a directory field to select a page directory entry as a selected page directory entry from said selected page directory; and (e) using said selected page directory entry and said second field to provide a physical address, applying a first portion of said second field and a second portion of said second field if said selected page directory entry indicates said physical address is located in a page frame having a first page frame size, and applying said second field as an offset field if said selected page directory entry indicates said physical address is located in a page frame having a second page frame size, wherein said first portion of said second field is applied as a page table field and said second portion of said second field is applied as an offset field.

16. An address translation apparatus for use by a processor to translate a linear address having no more than N bits into a physical address, said linear address having a first field and a second field, said address translation apparatus comprising:

means for executing one or more instructions on said processor to store a physical address mode indicator, said physical address mode indicator identifying which of a first physical address size and a second physical address size will be utilized by said processor, said first physical address size having no more than $2^N$ locations that can be addressed, said second physical address size having more than 2N locations that can be addressed;

means for formatting page directory entries in one or more page directories and page table entries in a plurality of page tables to be compatible with the physical address size identified by said physical address mode indicator;

means for applying both said first field and a value to select a page directory entry as a selected page directory entry if said first physical address size is identified by said physical address mode indicator, wherein said first field is applied as a directory field and said value is stored in said processor;

means for applying both a first portion of said first field and said value to select one of a plurality of directory pointer table entries as a selected directory pointer table entry, selecting one of a plurality of page directories as said selected page directory using said selected directory pointer table entry, and applying a second portion of said first field as a directory field to select a page directory entry as a selected page directory entry from said selected page directory if said second physical address size is identified by said physical address mode indicator, wherein said first portion of said first field is applied as a pointer field; and means for applying said selected page directory entry and said second field to provide a physical address.

17. The address translation apparatus of claim 16, wherein said means for applying said selected page directory entry and said second field to provide a physical address further includes applying a first portion of said second field and a second portion of said second field if said selected page directory entry indicates said physical address is located in a page frame having a first page frame size, and if said selected page directory entry indicates said physical address is located in a page frame having a second page frame size, said second field is applied as an offset field, wherein said first portion of said second field is applied as a page table field and said second portion of said second field is applied as an offset field.

18. An address translation method for translating a linear address into a physical address, said address translation method including a first address translation method for a first page size and a second translation method for a second page size larger than the first page size, said address translation method comprising the computer implemented steps of:

(a) determining which of a plurality of states is indicated by one or more control bits, wherein a first of said plurality of states indicates at least said first page size and said second page size can be simultaneously supported, wherein a second of said plurality of states indicates only one page frame size can be supported;

(b) if said one or more control bits are in said first of said plurality of states, then selecting either said first page size or said second page size, and if said one or more control bits are in said second of said plurality of states, then selecting said first page size;

(c) if the first page size has been selected, then performing the steps of (c)(1) applying a directory pointer field to select one of a plurality of directory pointers, (c)(2) using said selected directory pointer to select one of a plurality of page directories, (c)(3) applying the page directory field to said selected page directory table to select one of a plurality of page tables, (c)(4) applying the page table field to said selected page table to select one of a plurality of page frame addresses, and, (c)(5) using said page frame address and the offset field to provide a physical address; and (d) if the second page size has been selected, then performing the steps of (d)(1) applying a directory pointer field to select one of a plurality of directory pointers, (d)(2) using said selected directory pointer to select one of a plurality of page directories, (d)(3) applying the page directory field to said selected page directory table to select one of a plurality of page frame addresses, and (d)(4) using said page frame address and the offset field to provide a physical address.

* * * * *